US011912044B2

(12) United States Patent
Ohlig et al.

(10) Patent No.: US 11,912,044 B2
(45) Date of Patent: Feb. 27, 2024

(54) HEAT TRANSFER ROLLER APPARATUS AND ASSOCIATED METHODS OF USE

(71) Applicants: Albert Hans Ohlig, Newport Beach, CA (US); Don Walter Ohlig, San Clemente, CA (US)

(72) Inventors: Albert Hans Ohlig, Newport Beach, CA (US); Don Walter Ohlig, San Clemente, CA (US)

( * ) Notice: Subject to any disclaimer, the term of this patent is extended or adjusted under 35 U.S.C. 154(b) by 0 days.

(21) Appl. No.: 18/116,234

(22) Filed: Mar. 1, 2023

(65) Prior Publication Data

US 2023/0278347 A1 Sep. 7, 2023

Related U.S. Application Data

(60) Provisional application No. 63/315,816, filed on Mar. 2, 2022.

(51) Int. Cl.
*B41J 2/335* (2006.01)
*B41J 2/325* (2006.01)
*B41J 29/393* (2006.01)

(52) U.S. Cl.
CPC ............. *B41J 2/3354* (2013.01); *B41J 2/325* (2013.01); *B41J 29/393* (2013.01)

(58) Field of Classification Search
None
See application file for complete search history.

(56) References Cited

U.S. PATENT DOCUMENTS 3,857,015 A * 12/1974 Clark .................. B29C 66/8362 38/100
5,324,378 A * 6/1994 Sieber ...................... D06Q 1/12 156/289
5,644,988 A 7/1997 Xu et al.
2006/0249039 A1 11/2006 Feldman et al.
2016/0031228 A1* 2/2016 Will ...................... B41F 16/006 347/206

FOREIGN PATENT DOCUMENTS

JP 2020140093 A 9/2020

OTHER PUBLICATIONS

International Search Report and Written Opinion, PCT/US2023/014297, dated Jun. 7, 2023.

* cited by examiner

*Primary Examiner* — Alejandro Valencia
(74) *Attorney, Agent, or Firm* — Master Key IP, LLP; Justin G. Sanders

(57) ABSTRACT

A heat transfer roller apparatus is disclosed and configured for transferring an at least one design onto a substrate. In at least one embodiment, with the substrate sandwiched between a support frame and a support base of the apparatus, and a heat transfer compatible transfer sheet containing the at least one design positioned on the substrate within a frame boundary defined by the support frame, an at least one heat roller traverses across the transfer sheet—from a first end of the support frame to an opposing second end of the support frame—at a predetermined temperature, pressure and traversal time as set by a controller of the apparatus, so as to cause the at least one design on the transfer sheet to bond to the substrate, with a carrier of the apparatus subsequently separating the transfer sheet from the substrate while the transfer sheet is still hot.

19 Claims, 6 Drawing Sheets

HEAT TRANSFER ROLLER APPARATUS AND ASSOCIATED METHODS OF USE

RELATED APPLICATIONS

This application claims priority and is entitled to the filing date of U.S. provisional application Ser. No. 63/315,816, filed on Mar. 2, 2022. The contents of the aforementioned application are incorporated herein by reference.

BACKGROUND

The subject of this patent application relates generally to heat transfer techniques, and more particularly to a heat transfer roller apparatus and associated methods of use for more safely and effectively transferring a design onto a substrate.

Applicant hereby incorporates herein by reference any and all patents and published patent applications cited or referred to in this application.

By way of background, heat transfer printing is a technique by which desired decorations (i.e., text, artwork, and other types of two-dimensional designs—hereinafter generally referred to as a "design" for simplicity purposes) are transferred onto fabric or other materials (hereinafter generally referred to as a "substrate" for simplicity purposes). Traditionally, the design is first printed onto a heat transfer compatible transfer sheet (such as a sheet of paper or plastic coated in a wax and pigment polymer film, for example) using a heat transfer compatible transfer ink (such as inkjet ink, pigment ink or sublimation ink, for example). The substrate (such as a shirt, for example) is manually positioned on the heat pad of a heat press, and the transfer sheet is manually positioned on top of the substrate in the desired location. Once the heat platen of the heat press has reached the necessary temperature (typically between approximately 250 degrees and 400 degrees Fahrenheit), the heat press is closed by moving the flat heat platen down against the heat pad, sandwiching the transfer sheet and substrate therebetween. The desired pressure of the heat press, along with the press time, are set depending on the thickness of the substrate and the specific types of transfer sheet and transfer ink being used. The heat press causes the design on the transfer sheet to bond to the substrate. After the press time elapses, the heat platen is lifted up and the transfer sheet is manually removed while the transfer sheet is still hot, leaving the design on the substrate.

While this traditional heat transfer process can be effective at transferring designs onto substrates, it can be time intensive and also requires a lot of manual interaction which, in turn, creates room for error in the positioning of the design relative to the substrate, the necessary temperature of the heat press, the necessary pressure of the heat press, the necessary press time of the heat press, and the subsequent removal of the transfer sheet—each of which could lead to a defective end product. The manual interaction involved in the traditional heat transfer process also exposes the user to potential injury given the user's proximity to extremely hot surfaces.

Thus, there remains a need for an improved heat transfer apparatus capable of decreasing production time while also eliminating many of the manual steps required by traditional heat transfer techniques. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a heat transfer roller apparatus and associated methods of use for more safely and effectively transferring a design onto a substrate. In at least one embodiment, a printer is configured for printing the at least one design onto a heat transfer compatible transfer sheet using a heat transfer compatible transfer ink. A heat transfer assembly is positioned and configured for receiving the transfer sheet as it exits the printer. The heat transfer assembly provides a support base positioned and configured for supporting the substrate thereon, and a support frame positioned and configured for selectively sandwiching the substrate substantially between the support frame and the support base, the support frame defining a frame boundary within which a portion of the substrate on which the at least one design is to be heat transferred is left substantially unobstructed. An articulating carrier is configured for removably engaging a leading edge of the transfer sheet, positioning the transfer sheet in contact with the substrate in a location within the frame boundary, preventing the transfer sheet from unintentionally moving out of position relative to the substrate as the design is transferred onto the substrate, and separating the transfer sheet from the substrate after the design has been transferred onto the substrate. An at least one heat roller is positioned and configured for being in selective rolling contact with the transfer sheet when the transfer sheet is positioned on the substrate within the frame boundary. A controller is configured for automatically controlling each of the carrier and at least one heat roller. During use of the apparatus, with the substrate sandwiched between the support frame and the support base, and the transfer sheet positioned on the substrate within the frame boundary, the at least one heat roller traverses across the transfer sheet—from a first end of the support frame to an opposing second end of the support frame—at a predetermined temperature, pressure and traversal time as set by the controller, so as to cause the at least one design on the transfer sheet to bond to the substrate, with the carrier subsequently separating the transfer sheet from the substrate while the transfer sheet is still hot.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
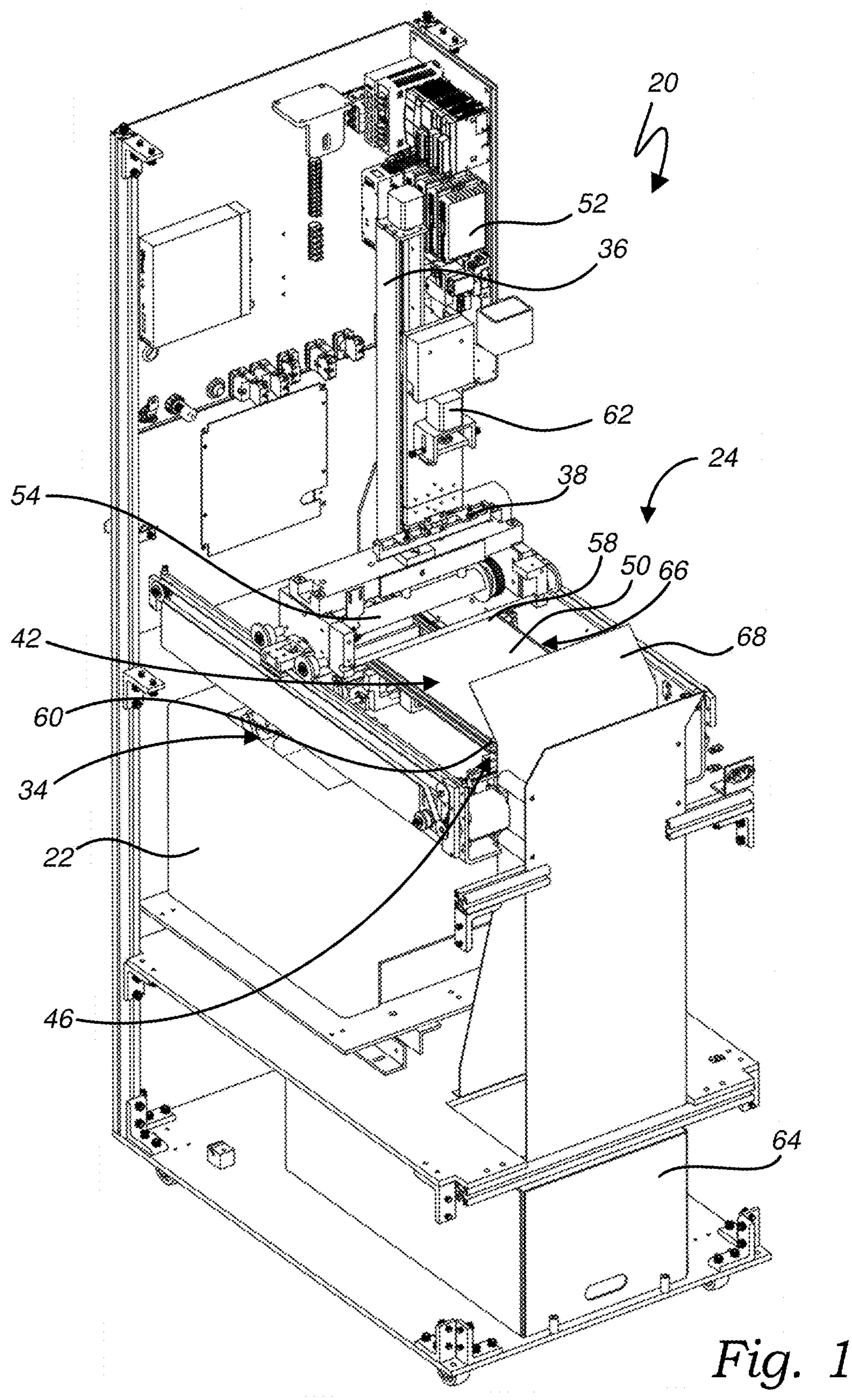
FIGS. 1 and 2 are perspective views of an exemplary heat transfer roller apparatus, in accordance with at least one embodiment.
Figure 2:
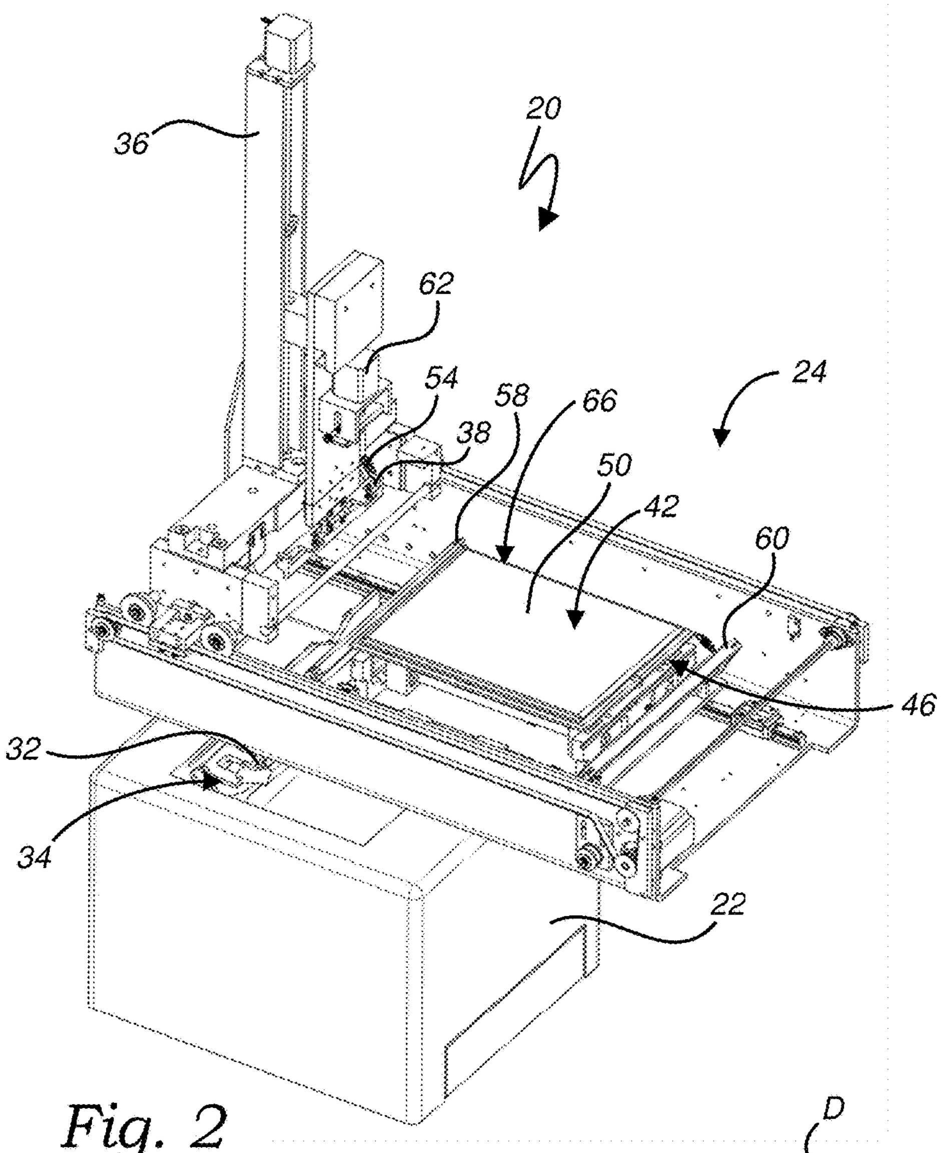

Turning now to FIGS. 1 and 2, there are shown perspective views of an exemplary embodiment of a heat transfer roller apparatus 20. At the outset, it should be noted that the respective sizes, shapes, dimensions and relative positions of the various components of the apparatus 20 as depicted in the drawings (and as described herein) are merely exemplary and are being shown for illustrative purposes. Accordingly, in further embodiments, each of the components of the apparatus 20 may take on any other sizes, shapes, dimensions and/or relative positions, now known or later developed, so long as the apparatus 20 is capable of substantially carrying out the functionality described herein.

With continued reference to FIGS. 1 and 2, in at least one embodiment, the apparatus 20 provides a printer 22 and a heat transfer assembly 24. In at least one embodiment, the printer 22 is configured for printing an at least one design 26 onto a heat transfer compatible transfer sheet 28 using a heat transfer compatible transfer ink 30. In at least one embodiment, the transfer sheet 28 is a sheet of paper or plastic coated in a wax and pigment polymer film; however, in further embodiments, the transfer sheet 28 may be constructed out of any other heat transfer compatible material (or combination of materials) now known or later developed. In at least one embodiment, the transfer ink 30 is an inkjet ink, a pigment ink or a sublimation ink; however, in further embodiments, the transfer ink 30 may be any other type of heat transfer compatible ink now known or later developed. In at least one embodiment, the printer 22 is an inkjet printer or a laser printer; however, in further embodiments, the printer 22 may be any other type of printer, now known or later developed, capable of printing the at least one design 26 onto a heat transfer compatible transfer sheet 28 using a heat transfer compatible transfer ink 30.

In at least one embodiment, the heat transfer assembly 24 is positioned and configured for receiving the transfer sheet 28 as it exits the printer 22—i.e., after the printer 22 prints the at least one design 26 onto the transfer sheet 28. In at least one embodiment, the heat transfer assembly 24 provides a loading ramp 32 extending between a paper outlet 34 of the printer 22 and an articulating carrier 36 of the heat transfer assembly 24, the loading ramp 32 being configured for assisting in the movement of the transfer sheet 28 from the paper outlet 34 of the printer 22 to the heat transfer assembly 24. In at least one such embodiment, the carrier 36 is configured for removably engaging a leading edge 40 of the transfer sheet 28—so as not to contact the at least one design 26 on the transfer sheet 28—upon the transfer sheet 28 reaching the carrier 36. In at least one embodiment, the carrier 36 provides an at least one clamp 38 configured for selectively engaging the leading edge 40 of the transfer sheet 28. In at least one such embodiment, the clamp 38 is actuated via a cam; however, in further embodiments, the clamp 38 may be actuated via any other mechanical, hydraulic or pneumatic mechanism (or combination of mechanisms), now known or later developed. In at least one alternate embodiment, the carrier 36 may provide any other type of mechanism or technique, now known or later developed, capable of selectively engaging the transfer sheet 28—either on the leading edge 40 of the transfer sheet 28 or elsewhere on the transfer sheet 28. In at least one alternate embodiment, the loading ramp 32 is omitted, and the carrier 36 is configured for selectively and automatically travelling between the paper outlet 34 of the printer 22 and the heat transfer assembly 24, such that the carrier 36 is able to removably engage the leading edge 40 of the transfer sheet 28 upon the transfer sheet 28 exiting the paper outlet 34 of the printer 22, and subsequently transport the transfer sheet 28 to the heat transfer assembly 24. In further alternate embodiments, the apparatus 20 may utilize any other mechanism or technique, now known or later developed, capable of assisting in the movement of the transfer sheet 28 from the paper outlet 34 of the printer 22 to the heat transfer assembly 24.

Figure 4:
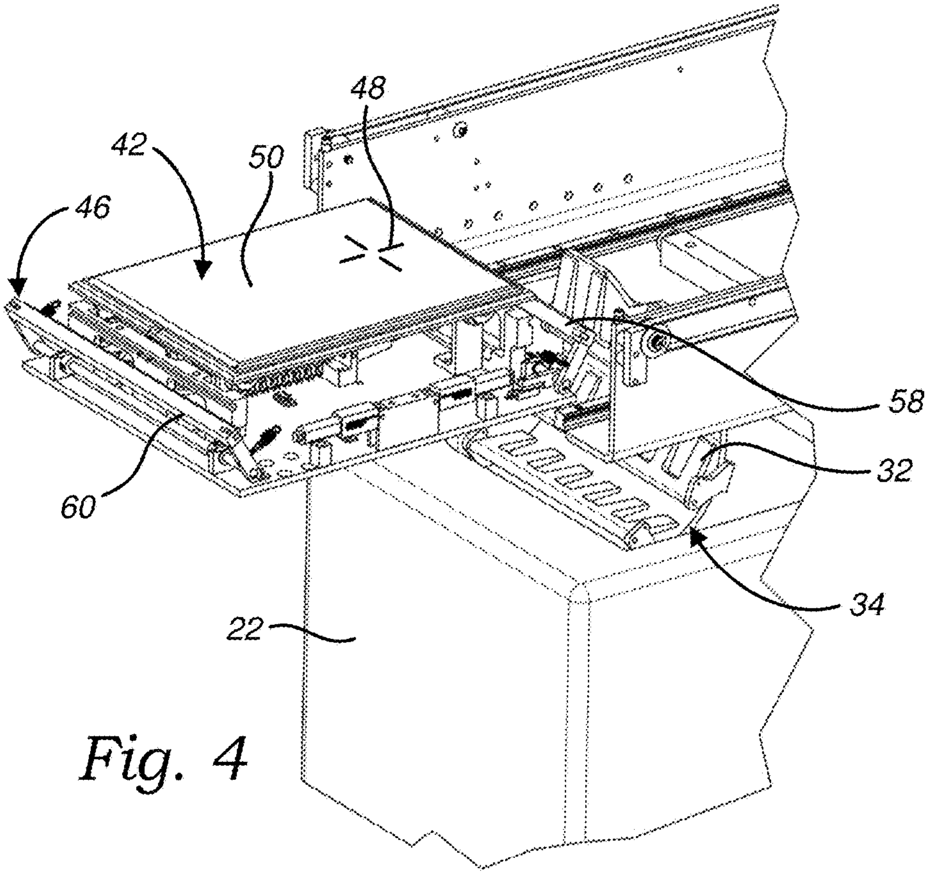
FIG. 4 is a partial perspective view of an exemplary support base of the apparatus, in accordance with at least one embodiment.
Figure 5:
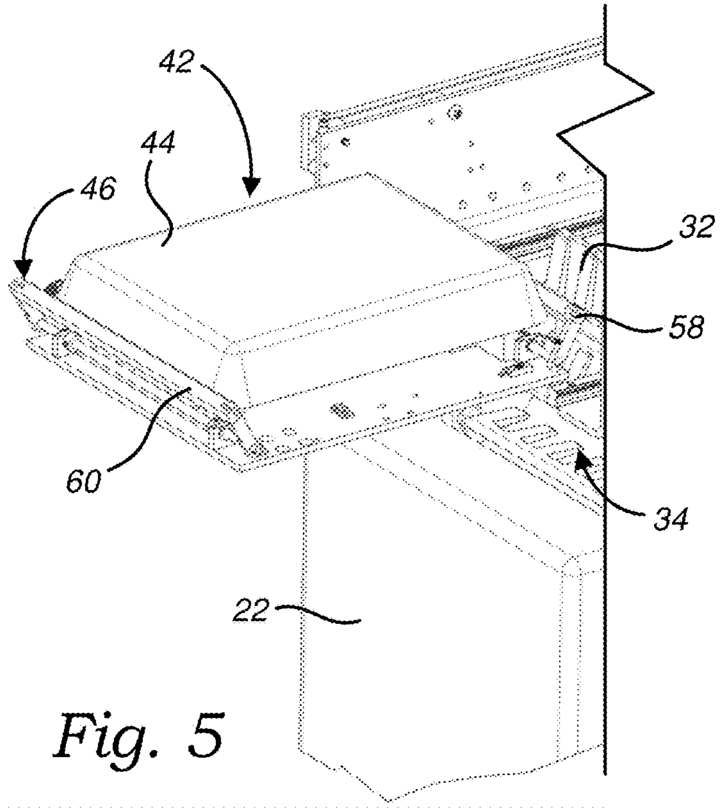
FIGS. 5-11 are further partial perspective views of an exemplary heat transfer roller apparatus, illustrating an exemplary method for transferring an at least one design from a heat transfer compatible transfer sheet onto a substrate.
Figure 6:
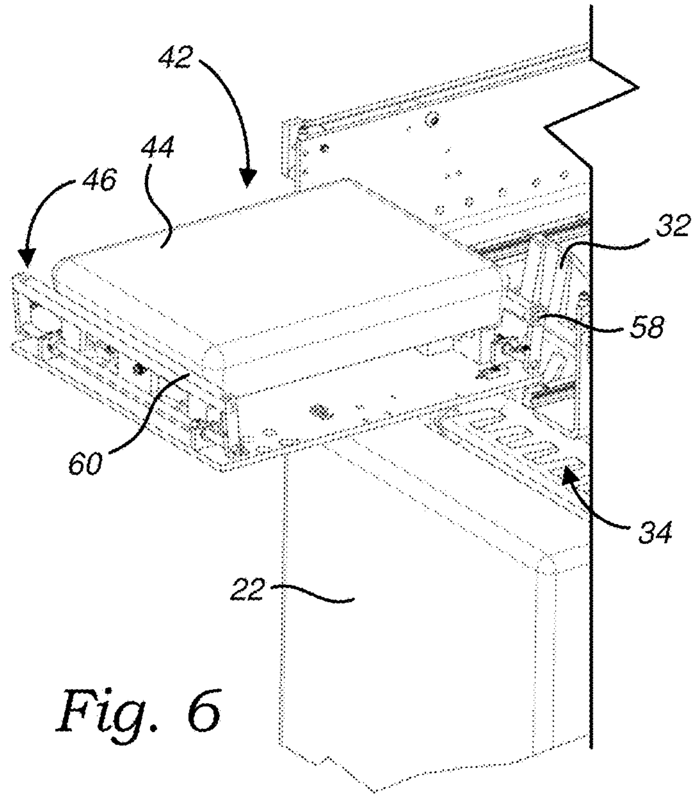

In at least one embodiment, as illustrated best in FIGS. 4-6, the heat transfer assembly 24 further provides a support base 42 positioned and configured for supporting a substrate 44 thereon—the substrate 44 being the material or object on which the at least one design 26 is to be heat transferred (such as a shirt, for example). In that regard, it should be noted that the substrate 44 may be any material or object, now known or later developed, that is heat transfer compatible. Furthermore, the substrate 44 may take on any size, shape or dimensions, now known or later developed—though dependent, at least in part, on the size of the apparatus 20. In at least one embodiment, the heat transfer assembly 24 further provides a support frame 46 positioned and configured for selectively sandwiching the substrate 44 between the support frame 46 and the support base 42. The support frame 46 defines a frame boundary 66 within which a portion of the substrate 44 on which the at least one design 26 is to be heat transferred is left substantially unobstructed. In at least one embodiment, as illustrated in FIGS. 5 and 6, each of a first end 58 of the support frame 46 and an opposing second end 60 of the support frame 46 is configured as a pivotable arm configured for selectively rotating between one of a disengaged position—wherein each of the first end 58 and second end 60 are rotated away from the support base 42 (FIG. 5)—and an engaged position—wherein each of the first end 58 and second end 60 are rotated into contact with the support base 42 so as to sandwich the substrate 44 between the first and second ends 58 and 60 of the support frame 46 and the support base 42 (FIG. 6). Thus, in such embodiments, the support frame 46 and support base 42 cooperate to prevent the substrate 44 from unintentionally moving during the heat transfer process. In at least one alternate embodiment, the support frame 46 extends around an entire perimeter of the support base 42 (and, in turn, the frame boundary 66). In still further embodiments, the support frame 46 may take on any other sizes, shapes, dimensions and/or configurations, now known or later developed, so long as the support frame 46 is capable of substantially carrying out the functionality described herein. In at least one embodiment, the carrier 36 is configured for automatically positioning the transfer sheet 28 in contact with the substrate 44 in a desired location within the frame boundary 66, as discussed further below.

In at least one embodiment, the support base 42 is constructed out of a heat resistant material, such as foam or silicone rubber, for example. Additionally, in at least one embodiment, the support base 42 has a thickness T of approximately 5-10 millimeters. However, in further embodiments, the support base 42 may have any other thickness T, now known or later developed, dependent at least in part on the sizes of one or more of the apparatus 20, the substrate 44 and the transfer sheet 28. In at least one embodiment where the substrate 44 is manually positionable on the support base 42 by a user, the support base 42 and support frame 46 are slidably or pivotally engaged with the heat transfer assembly 24, such that the support base 42 and support frame 46 are able to selectively slide or pivot a distance out and away from the heat transfer assembly 24 to allow the user to more easily access the support base 42 and support frame 46, thereby facilitating the manual positioning of the substrate 44. In at least one such embodiment, as best illustrated in FIG. 4, the heat transfer assembly 24 provides an at least one positioning indicator 48 configured for assisting the user in manually positioning the substrate 44 on the support base 42 so as to better ensure proper placement of the substrate 44, depending on a desired location for the at least one design 26 to be transferred thereon. In at least one such embodiment, the at least one positioning indicator 48 is a set of printed indicia positioned on a top surface 50 of the support base 42. In at least one alternate such embodiment, the at least one positioning indicator 48 is a light- or laser-based indicia system configured for projecting indicia onto the top surface 50 of the support base 42. In further such embodiments, the at least one positioning indicator 48 may be any other type of positioning indicator 48, now known or later developed, capable of assisting the user in manually positioning the substrate 44 on the support base 42. In at least one alternate embodiment, the heat transfer assembly 24 is configured for automatically positioning the substrate 44 on the support base 42 via a computerized controller 52 provided by the apparatus 20.

Figure 3:
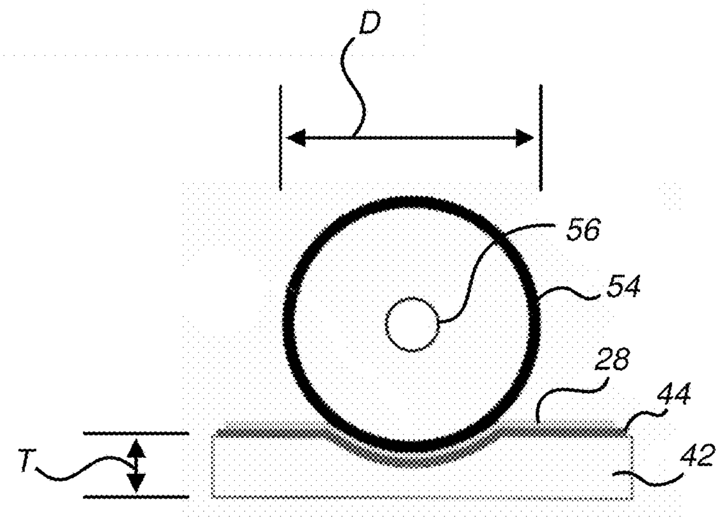
FIG. 3 is a diagrammatic view of a roller of the apparatus, in accordance with at least one embodiment.

In at least one embodiment, the heat transfer assembly 24 further provides an at least one heat roller 54 positioned and configured for being in selective rolling contact with the transfer sheet 28 when the transfer sheet 28 is positioned on the substrate 44 within the frame boundary 66, so as to cause the at least one design 26 on the transfer sheet 28 to bond to the substrate 44, as discussed further below. In at least one embodiment, the at least one heat roller 54 is substantially cylindrical in shape with a heat source 56 positioned concentrically within the heat roller 54, the heat source 56 configured for selectively heating the heat roller 54 to a desired temperature during use of the apparatus 20. In at least one embodiment, the heat source 56 is manually controlled by a user of the apparatus 20; however, in at least one alternate embodiment, the heat source 56 is automatically controlled by the controller 52. Additionally, in at least one embodiment, as illustrated in FIG. 3, the at least one heat roller 54 is substantially circular in cross section; however, in further embodiments, the at least one heat roller 54 may take on other shapes in cross section, now known or later developed, such as hexagonal or octagonal for example, so long as the apparatus 20 is capable of substantially carrying out the functionality described herein. In at least one embodiment, the at least one heat roller 54 has a diameter D of approximately 1-3 inches. However, in further embodiments, the at least one heat roller 54 may have any other diameter D, now known or later developed, dependent at least in part on one or more of the sizes of the apparatus 20, the substrate 44 and the transfer sheet 28. In at least one embodiment, an outer surface of the at least one heat roller 54 is coated or otherwise constructed out of a non-stick material, such as polytetrafluoroethylene (PTFE) for example.

As noted above, the at least one heat roller 54 is configured for being in selective rolling contact with the transfer sheet 28 when the transfer sheet 28 is positioned on the substrate 44, between the support frame 46 and the support base 42. In at least one embodiment, the transfer sheet 28, substrate 44, support frame 46 and support base 42 remain substantially stationary while the at least one heat roller 54 is configured for selectively traversing across the transfer sheet 28 within the frame boundary 66—from the first end 58 of the support frame 46 to the opposing second end 60 of the support frame 46. In at least one alternate embodiment, the at least one heat roller 54 remains substantially stationary within the frame boundary 66 while the support frame 46 and support base 42 are configured for selectively moving the transfer sheet 28 and substrate 44 relative to the at least one heat roller 54. Either way, in at least one embodiment, movement of these components is automatically controlled by the controller 52, with the movement being carried out by an at least one motor 62 in mechanical communication with said components.

Utilization of the at least one heat roller 54 has a number of advantages as compared to prior art flat heat platens. Because the at least one heat roller 54 is configured for being in selective rolling contact with the transfer sheet 28, it does not need to contact the entire transfer sheet 28 at once, which means that the at least one heat roller 54 is able to be relatively smaller and more compact than prior art flat heat platens. This, in turn, allows the entire apparatus 20 to be relatively smaller and more compact as well. The relatively smaller size of the at least one heat roller 54 also reduces the amount of energy required to selectively heat the at least one heat roller 54, while reducing the time it takes for the at least one heat roller 54 to reach the desired temperature as well. In at least one embodiment, the size and configuration of the at least one heat roller 54 allows the apparatus 20 to maintain the at least one heat roller 54 at a desired "pre-heat" temperature when the apparatus 20 is not in use (i.e., when the apparatus 20 is not being used to transfer a design 26 onto a substrate 44), thereby enabling the at least one heat roller 54 to reach the desired temperature relatively faster upon the apparatus 20 subsequently being used. Additionally, because the at least one heat roller 54 is configured for being in selective rolling contact with the transfer sheet 28, the contact between the at least one heat roller 54 and the transfer sheet 28 is tangential (as illustrated in FIG. 3), which significantly reduces the amount of pressure between the at least one heat roller 54 and the transfer sheet 28 necessary to successfully transfer the at least one design 26 onto the substrate 44. For example, in at least one embodiment, the heat transfer assembly 24 exerts approximately 2-10 pounds per square inch of force on the at least one heat roller 54 during use of the apparatus 20, as compared to prior art flat heat platens which typically require several hundred pounds (if not thousands of pounds) of force. In at least one such embodiment, the tangential contact between the at least one heat roller 54 and the transfer sheet 28 also permits a deformation of the transfer sheet 28 and substrate 44, which better ensures that the at least one design 26 properly transfers onto the substrate 44 (particularly where the substrate 44 is a textile or other flexible material). Thus, in such embodiments, the at least one heat roller 54 is capable of better penetrating the substrate 44 as compared to flat prior art heat platens, resulting in a relatively more effective transfer of the at least one design 26 onto the substrate 44 using a relatively smaller footprint, relatively less heat energy, and relatively less pressure.

As noted above, in at least one embodiment, the carrier 36 is configured for removably engaging the leading edge 40 of the transfer sheet 28 and positioning the transfer sheet 28 in contact with the substrate 44 in a desired location within the frame boundary 66. In such embodiments, the carrier 36 is further configured for preventing the transfer sheet 28 from unintentionally moving out of position relative to the substrate 44 while the at least one heat roller 54 traverses across the transfer sheet 28. In at least one such embodiment, where the transfer sheet 28, substrate 44, support frame 46 and support base 42 remain substantially stationary while the at least one heat roller 54 selectively traverses across the transfer sheet 28, the carrier 36 is also configured for remaining substantially stationary relative to the transfer sheet 28, substrate 44, support frame 46 and support base 42. In at least one alternate such embodiment, where the at least one heat roller 54 remains substantially stationary within the frame boundary 66 while the support frame 46 and support base 42 are configured for selectively moving the transfer sheet 28 and substrate 44 relative to the at least one heat roller 54, the carrier 36 is configured for moving in unison with the support frame 46 and support base 42. In at least one embodiment, the carrier 36 is further configured for automatically separating the transfer sheet 28 from the substrate 44 after the at least one heat roller 54 has passed over the transfer sheet 28, while the transfer sheet 28 is still hot, leaving behind the at least one design 26 on the substrate 44. In at least one such embodiment, the carrier 36 separates the transfer sheet 28 from the substrate 44 after the at least one heat roller 54 has passed over the entire transfer sheet 28. In at least one alternate such embodiment, the carrier 36 incrementally separates the transfer sheet 28 from the substrate 44 as the at least one heat roller 54 passes over the transfer sheet 28, such that the at least one heat roller 54 is able to stabilize the substrate 44 while the transfer sheet 28 is separated therefrom.

In at least one embodiment, the heat transfer assembly 24 further provides an at least one sheet collection container 64 positioned and configured for receiving the discarded transfer sheet 28 after the transfer sheet 28 has been fully separated from the substrate 44. In at least one such embodiment, the sheet collection container 64 is removably positioned within the heat transfer assembly 24. In at least one further such embodiment, the sheet collection container 64 is permanently positioned within the heat transfer assembly 24, with the heat transfer assembly 24 providing an access door positioned and configured for allowing the sheet collection container 64 to be accessed and selectively emptied. In at least one still further embodiment, the sheet collection container 64 is positioned external to the heat transfer assembly 24. It should also be noted that the size, shape, dimensions, quantity and relative position of the at least one sheet collection container 64 as depicted in the drawings (and as described herein) is merely exemplary; thus, in further embodiments, the at least one sheet collection container 64 may take on any other size, shape, dimensions and/or quantity, now known or later developed, and may be positioned and/or arranged elsewhere on or within the heat transfer assembly 24, so long as the apparatus 20 is capable of substantially carrying out the functionality described herein. In at least one embodiment, as best illustrated in FIGS. 1 and 10, the heat transfer assembly 24 provides a discard ramp 68 extending between the carrier 36 and the sheet collection container 64, the discard ramp 68 being configured for assisting in the movement of the transfer sheet 28 from the carrier 36 to the sheet collection container 64.

Figure 7:
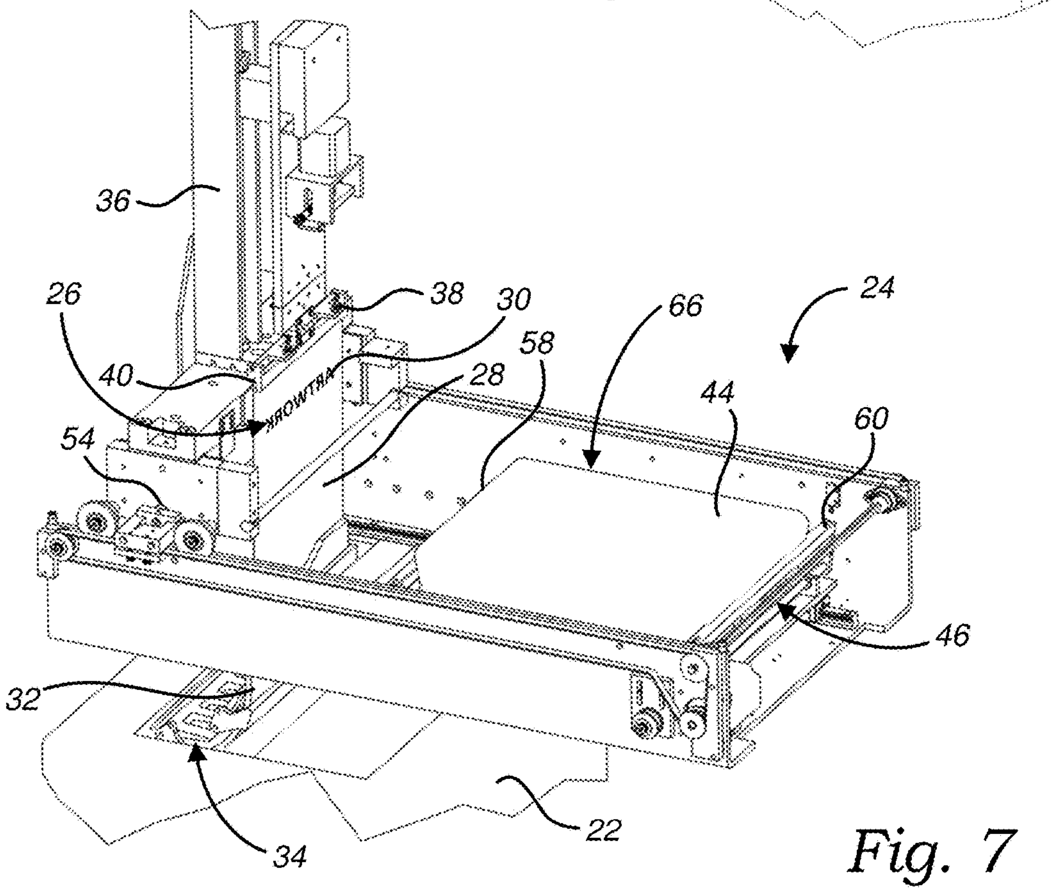
Figure 8:
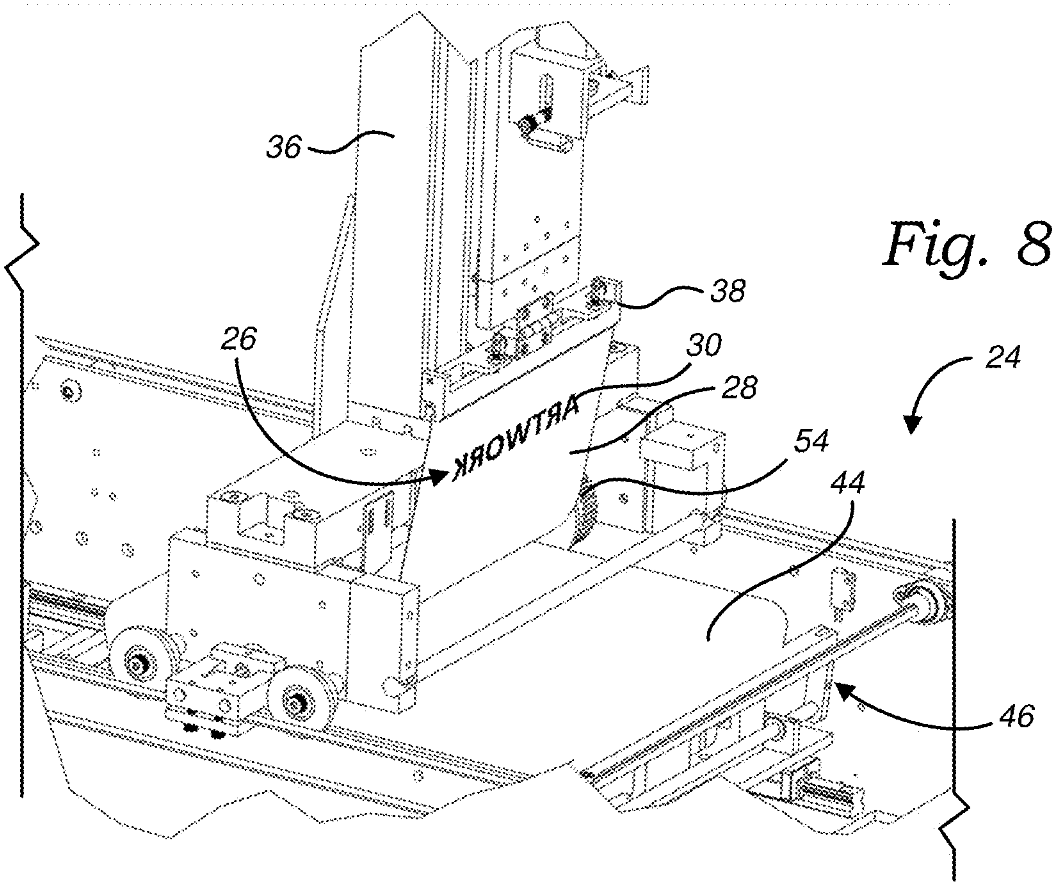
Figure 9:
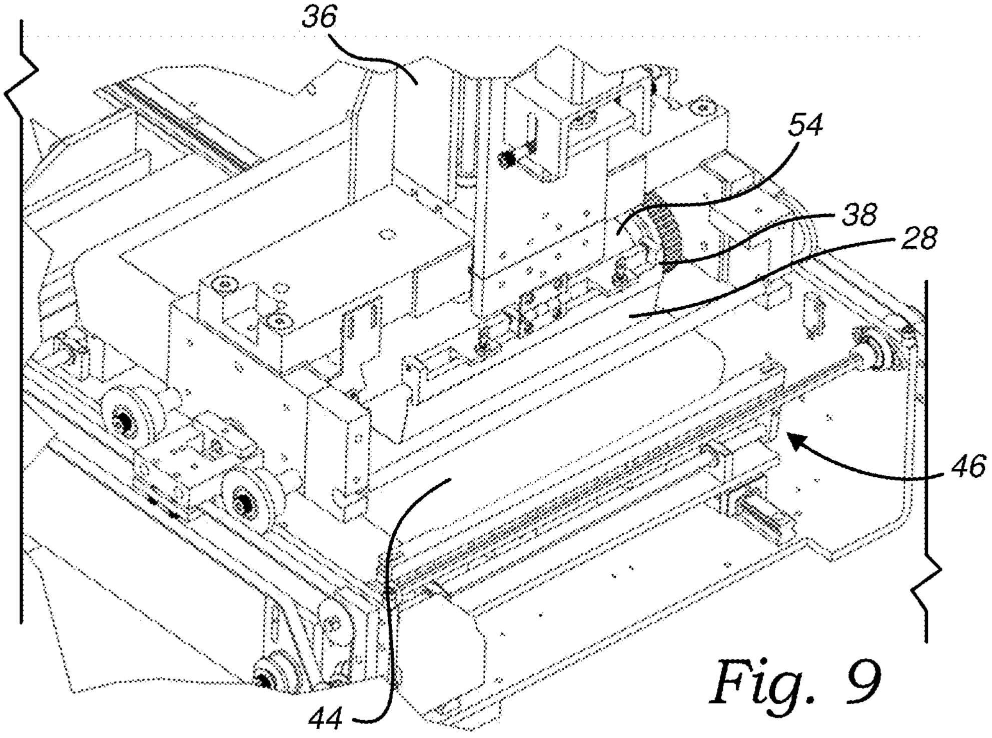
Figure 10:
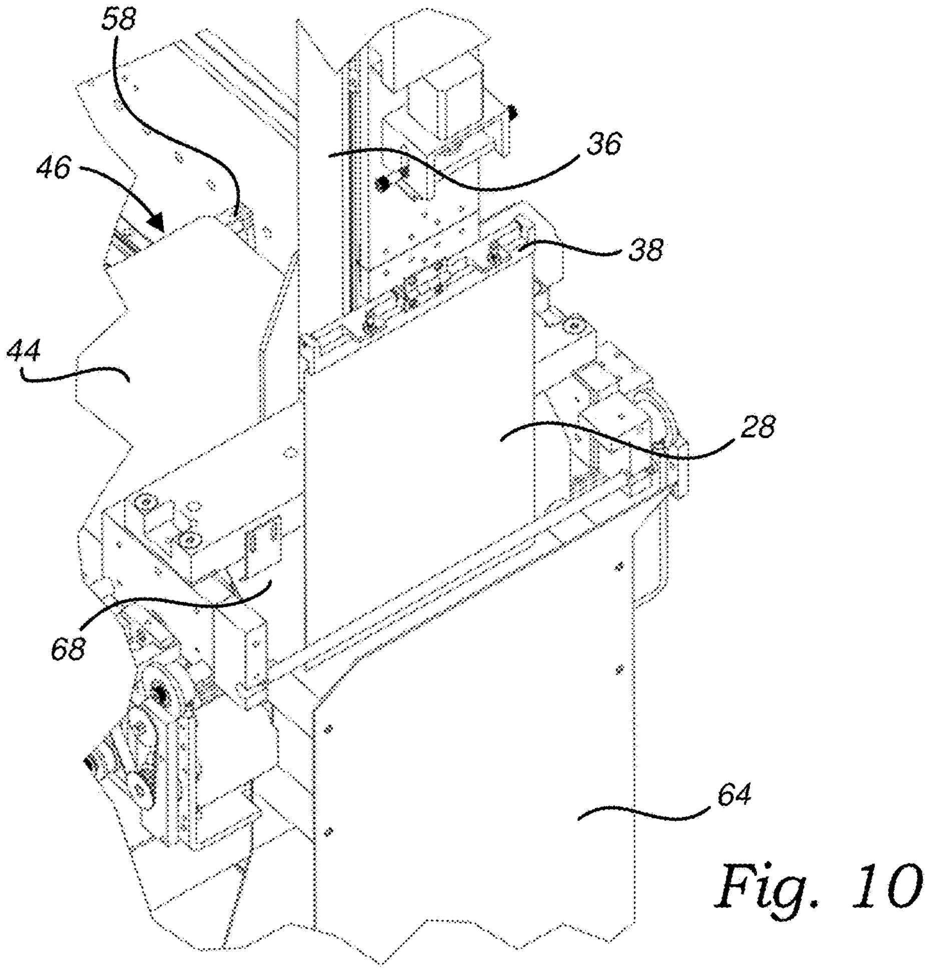
Figure 11:
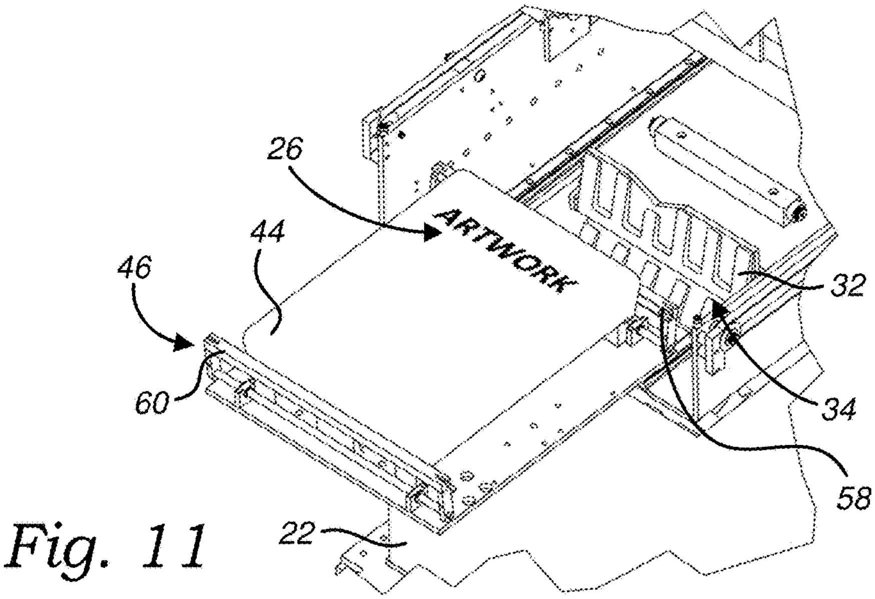

During use of the apparatus 20, in at least one embodiment, as illustrated in FIGS. 5-11, the substrate 44 is first positioned on the support base 42 (FIG. 5) and the support frame 46 is moved into contact with the substrate 44 (FIG. 6), such that the substrate 44 is sandwiched between the support frame 46 and the support base 42 while leaving substantially unobstructed the portion of the substrate 44 on which the at least one design 26 is to be heat transferred. The combination of the support base 42, substrate 44 and support frame 46 is moved into position within the heat transfer assembly 24 (FIG. 7) such that the at least one heat roller 54 is positioned within the frame boundary 66 (i.e., overtop of the portion of the substrate 44 on which the at least one design 26 is to be heat transferred). In at least one embodiment, upon the controller 52 determining that the at least one heat roller 54 has reached a desired temperature (such as approximately 300 degrees Fahrenheit, in at least one embodiment, though ultimately dependent at least in part on the characteristics of the transfer sheet 28 and/or substrate 44), the at least one heat roller 54 traverses across the substrate 44—from the first end 58 of the support frame 46 to the opposing second end 60 of the support frame 46—at least once so as to dry and preheat the substrate 44. In at least one such embodiment, upon the controller 52 determining that the substrate 44 has reached a desired preheat temperature, the printer 22 prints the at least one design 26 onto the transfer sheet 28, and the transfer sheet 28 is moved from the paper outlet 34 of the printer 22 to the carrier 36 of the heat transfer assembly 24 (FIG. 7). The carrier 36 positions the transfer sheet 28 in contact with the substrate 44 in a desired location within the frame boundary 66, and maintains the position of the transfer sheet 28 relative to the substrate 44. The at least one heat roller 54 traverses across the transfer sheet 28—from the first end 58 of the support frame 46 to the opposing second end 60 of the support frame 46 (FIG. 8)—at least once, at a predetermined pressure (dependent at least in part on the characteristics of the transfer sheet 28 and/or substrate 44) and traversal time (such as approximately 30-60 seconds, in at least one embodiment, though ultimately dependent at least in part on the characteristics of the transfer sheet 28 and/or substrate 44) as set by the controller 52, so as to cause the at least one design 26 on the transfer sheet 28 to bond to the substrate 44. In at least one embodiment, the at least one heat roller 54 traverses across the transfer sheet 28 a second time so as to strengthen the bond between the at least one design 26 and the substrate 44. As the at least one heat roller 54 passes over the transfer sheet 28, the carrier 36 separates the transfer sheet 28 from the substrate 44 (FIG. 9) while the transfer sheet 28 is still hot, leaving behind the at least one design 26 on the substrate 44. The carrier 36 discards the transfer sheet 28 in the sheet collection container 64 (FIG. 10). In at least one embodiment, the at least one heat roller 54 traverses across the substrate 44 at least once more so as to increase the durability of the design 26 on the substrate 44. In at least one such embodiment, the carrier 36 is configured for positioning a protective sheet (not shown) on top of the design 26 prior to the at least one heat roller 54 traversing across the substrate 44, so as to prevent the design 26 from separating from the substrate 44 as the at least one heat roller 54 traverses thereacross. After the design 26 has been transferred onto the substrate 44 (FIG. 11), the support frame 46 is disengaged from the support base 42, and the substrate 44 may be removed from the heat transfer assembly 24. Again, as noted above, in at least one embodiment, each of the above described steps may be carried out automatically by the apparatus 20 (via the controller 52).

Aspects of the present specification may also be described as the following embodiments:

1. A heat transfer roller apparatus configured for transferring an at least one design onto a substrate, the apparatus comprising: a printer configured for printing the at least one design onto a heat transfer compatible transfer sheet using a heat transfer compatible transfer ink; a heat transfer assembly positioned and configured for receiving the transfer sheet as it exits the printer, the heat transfer assembly comprising: a support base positioned and configured for supporting the substrate thereon; a support frame positioned and configured for selectively sandwiching the substrate substantially between the support frame and the support base, the support frame defining a frame boundary within which a portion of the substrate on which the at least one design is to be heat transferred is left substantially unobstructed; an articulating carrier configured for removably engaging a leading edge of the transfer sheet, positioning the transfer sheet in contact with the substrate in a location within the frame boundary, preventing the transfer sheet from unintentionally moving out of position relative to the substrate as the design is transferred onto the substrate, and separating the transfer sheet from the substrate after the design has been transferred onto the substrate; an at least one heat roller positioned and configured for being in selective rolling contact with the transfer sheet when the transfer sheet is positioned on the substrate within the frame boundary; and a controller configured for automatically controlling each of the carrier and at least one heat roller; whereby, during use of the apparatus, with the substrate sandwiched between the support frame and the support base, and the transfer sheet positioned on the substrate within the frame boundary, the at least one heat roller traverses across the transfer sheet—from a first end of the support frame to an opposing second end of the support frame—at a predetermined temperature, pressure and traversal time as set by the controller, so as to cause the at least one design on the transfer sheet to bond to the substrate, with the carrier subsequently separating the transfer sheet from the substrate while the transfer sheet is still hot.
2. The heat transfer roller apparatus according to embodiment 1, wherein the transfer sheet is a sheet of paper or plastic coated in a wax and pigment polymer film.
3. The heat transfer roller apparatus according to embodiments 1-2, wherein the printer is an inkjet printer or a laser printer.
4. The heat transfer roller apparatus according to embodiments 1-3, wherein the transfer ink is an inkjet ink, a pigment ink or a sublimation ink.
5. The heat transfer roller apparatus according to embodiments 1-4, wherein the support base is constructed out of a heat resistant material.
6. The heat transfer roller apparatus according to embodiments 1-5, wherein the support base has a thickness of approximately 5-10 millimeters.
7. The heat transfer roller apparatus according to embodiments 1-6, wherein: the at least one heat roller is substantially cylindrical in shape; and the at least one heat roller provides a heat source positioned concentrically within said heat roller, the heat source configured for selectively heating said heat roller to a desired temperature during use of the apparatus.
8. The heat transfer roller apparatus according to embodiments 1-7, wherein the at least one heat roller is substantially circular in cross section.
9. The heat transfer roller apparatus according to embodiments 1-8, wherein the at least one heat roller has a diameter of approximately 1-3 inches.
10. The heat transfer roller apparatus according to embodiments 1-9, wherein the heat transfer assembly provides a loading ramp extending between a paper outlet of the printer and the carrier of the heat transfer assembly, the loading ramp configured for assisting in the movement of the transfer sheet from the paper outlet of the printer to the heat transfer assembly.
11. The heat transfer roller apparatus according to embodiments 1-10, wherein the carrier provides an at least one clamp configured for selectively engaging the leading edge of the transfer sheet.
12. The heat transfer roller apparatus according to embodiments 1-11, wherein the carrier is further configured for selectively and automatically travelling between a paper outlet of the printer and the heat transfer assembly, such that the carrier is able to removably engage the leading edge of the transfer sheet upon the transfer sheet exiting the paper outlet of the printer, and subsequently transport the transfer sheet to the heat transfer assembly.
13. The heat transfer roller apparatus according to embodiments 1-12, wherein the carrier is further configured for automatically positioning the transfer sheet in contact with the substrate in a desired location within the frame boundary.
14. The heat transfer roller apparatus according to embodiments 1-13, wherein the support base and support frame are slidably or pivotally engaged with the heat transfer assembly, such that the support base and support frame are able to selectively slide or pivot a distance out and away from the heat transfer assembly for assisting in the manual placement of the substrate on the support base.
15. The heat transfer roller apparatus according to embodiments 1-14, wherein the heat transfer assembly provides an at least one positioning indicator configured for assisting in the manual positioning of the substrate on the support base.
16. The heat transfer roller apparatus according to embodiments 1-15, wherein the at least one positioning indicator is a set of printed indicia positioned on a top surface of the support base.
17. The heat transfer roller apparatus according to embodiments 1-16, wherein the at least one positioning indicator is a light- or laser-based indicia system configured for projecting indicia onto a top surface of the support base.
18. The heat transfer roller apparatus according to embodiments 1-17, wherein the heat transfer assembly further provides an at least one sheet collection container positioned and configured for receiving the transfer sheet after the transfer sheet has been fully separated from the substrate by the carrier.
19. The heat transfer roller apparatus according to embodiments 1-18, wherein the heat transfer assembly provides a discard ramp capable of extending between the carrier of the heat transfer assembly and the at least one sheet collection container, the discard ramp configured for assisting in the movement of the transfer sheet from the carrier to the at least one sheet collection container.

20. The heat transfer roller apparatus according to embodiments 1-19, wherein the support frame extends around an entire perimeter of the support base.

21. The heat transfer roller apparatus according to embodiments 1-20, wherein the first and second ends of the support frame are configured for selectively rotating between one of a disengaged position—wherein each of the first and second ends is rotated away from the support base—and an engaged position—wherein each of the first and second ends is rotated into contact with the support base so as to sandwich the substrate substantially between the first and second ends of the support frame and the support base.

22. A heat transfer roller apparatus configured for transferring an at least one design onto a substrate, the apparatus comprising: a heat transfer assembly positioned and configured for receiving a heat transfer compatible transfer sheet as it exits a printer, the printer configured for printing the at least one design onto the transfer sheet using a heat transfer compatible transfer ink, the heat transfer assembly comprising: a support base positioned and configured for supporting the substrate thereon; a support frame positioned and configured for selectively sandwiching the substrate substantially between the support frame and the support base, the support frame defining a frame boundary within which a portion of the substrate on which the at least one design is to be heat transferred is left substantially unobstructed; an articulating carrier configured for removably engaging a leading edge of the transfer sheet, positioning the transfer sheet in contact with the substrate in a location within the frame boundary, preventing the transfer sheet from unintentionally moving out of position relative to the substrate as the design is transferred onto the substrate, and separating the transfer sheet from the substrate after the design has been transferred onto the substrate; an at least one heat roller positioned and configured for being in selective rolling contact with the transfer sheet when the transfer sheet is positioned on the substrate within the frame boundary; and a controller configured for automatically controlling each of the carrier and at least one heat roller; whereby, during use of the apparatus, with the substrate sandwiched between the support frame and the support base, and the transfer sheet positioned on the substrate within the frame boundary, the at least one heat roller traverses across the transfer sheet—from a first end of the support frame to an opposing second end of the support frame—at a predetermined temperature, pressure and traversal time as set by the controller, so as to cause the at least one design on the transfer sheet to bond to the substrate, with the carrier subsequently separating the transfer sheet from the substrate while the transfer sheet is still hot.

23. A method for transferring an at least one design from a heat transfer compatible transfer sheet onto a substrate using the heat transfer roller apparatus of claim 1, the method comprising the steps of: positioning the substrate onto the support base; moving the support frame into contact with the substrate, such that the substrate is sandwiched between the support frame and the support base while leaving substantially unobstructed a portion of the substrate on which the at least one design is to be heat transferred; printing the at least one design onto the transfer sheet using the printer; moving the transfer sheet from a paper outlet of the printer to the carrier of the heat transfer assembly; positioning the transfer sheet, via the carrier, in contact with the substrate in a desired location within the frame boundary of the support frame; and upon the controller determining that the at least one heat roller has reached a desired temperature: moving the at least one heat roller into rolling contact with the transfer sheet at a predetermined pressure; rolling the at least one heat roller across the transfer sheet—from the first end of the support frame to the opposing second end of the support frame—at a predetermined traversal time, so as to cause the at least one design on the transfer sheet to bond to the substrate; and separating the transfer sheet, via the carrier, from the substrate while the transfer sheet is still hot.

24. The method according to embodiment 23, further comprising the steps of: moving the at least one heat roller into rolling contact with the substrate prior to the transfer sheet being positioned on the substrate; and rolling the at least one heat roller across the substrate—from the first end of the support frame to the opposing second end of the support frame—so as to dry and preheat the substrate prior to the transfer sheet being positioned on the substrate.

25. The method according to embodiments 23-24, further comprising the step of rolling the at least one heat roller across the transfer sheet again—from the first end of the support frame to the opposing second end of the support frame—at a predetermined traversal time, so as to strengthen the bond between the at least one design and the substrate.

26. The method according to embodiments 23-25, further comprising the steps of: moving the at least one heat roller into rolling contact with the substrate after the at least one design has bonded to the substrate and the transfer sheet has been separated from the substrate; and rolling the at least one heat roller across the substrate—from the first end of the support frame to the opposing second end of the support frame—so as to increase the durability of the at least one design on the substrate.

27. The method according to embodiments 23-26, further comprising the steps of: disengaging the support frame from the support base; and removing the substrate from the heat transfer assembly.

In closing, regarding the exemplary embodiments of the present invention as shown and described herein, it will be appreciated that a heat transfer roller apparatus and associated methods are disclosed and configured for more safely and effectively transferring a design onto a substrate. Because the principles of the invention may be practiced in a number of configurations beyond those shown and described, it is to be understood that the invention is not in any way limited by the exemplary embodiments, but is generally directed to a heat transfer roller apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A heat transfer roller apparatus configured for transferring an at least one design onto a substrate, the apparatus comprising:

a printer configured for printing the at least one design onto a heat transfer compatible transfer sheet using a heat transfer compatible transfer ink;

a heat transfer assembly positioned and configured for receiving the transfer sheet as it exits the printer, the heat transfer assembly comprising:

a support base positioned and configured for supporting the substrate thereon;

a support frame positioned and configured for selectively sandwiching the substrate substantially between the support frame and the support base, the support frame defining a frame boundary along at least a portion of a perimeter of the substrate such that a portion of the substrate positioned within the frame boundary and on which the at least one design is to be heat transferred is left substantially unobstructed by the support frame;

an articulating carrier providing:

an at least one clamp configured for removably engaging a leading edge of the transfer sheet, the at least one clamp further configured for selectively traveling between an upper end and an opposing lower end of the carrier for positioning the transfer sheet in contact with the substrate in a location within the frame boundary, preventing the transfer sheet from unintentionally moving out of position relative to the substrate as the design is transferred onto the substrate, and separating the transfer sheet from the substrate after the design has been transferred onto the substrate; and an at least one heat roller positioned proximal to the lower end of the carrier, in a position behind the at least one clamp, the at least one heat roller configured for being in selective rolling contact with the transfer sheet, within the frame boundary, when the transfer sheet is positioned on the substrate; and a controller configured for automatically controlling each of the carrier and at least one heat roller;

whereby, during use of the apparatus, with the substrate sandwiched between the support frame and the support base, and the at least one clamp engaged with the leading edge of the transfer sheet after the transfer sheet exits the printer, the at least one clamp moves toward the lower end of the carrier so as to position the transfer sheet on the substrate within the frame boundary, while the at least one heat roller simultaneously traverses across the transfer sheet—from a first end of the support frame to an opposing second end of the support frame—at a predetermined temperature, pressure and traversal time as set by the controller, so as to cause the at least one design on the transfer sheet to bond to the substrate, with the at least one clamp subsequently moving toward the upper end of the carrier so as to separate the transfer sheet from the substrate while the transfer sheet is still hot.

2. The heat transfer roller apparatus of claim 1, wherein the support base is constructed out of a heat resistant material.

3. The heat transfer roller apparatus of claim 1, wherein the support base has a thickness of approximately 5-10 millimeters.

4. The heat transfer roller apparatus of claim 1, wherein:

the at least one heat roller is substantially cylindrical in shape; and the at least one heat roller provides a heat source positioned concentrically within said heat roller, the heat source configured for selectively heating said heat roller to a desired temperature during use of the apparatus.

5. The heat transfer roller apparatus of claim 4, wherein the at least one heat roller is substantially circular in cross section.

6. The heat transfer roller apparatus of claim 4, wherein the at least one heat roller has a diameter of approximately 1-3 inches.

7. The heat transfer roller apparatus of claim 1, wherein the heat transfer assembly provides a loading ramp extending between a paper outlet of the printer and the carrier of the heat transfer assembly, the loading ramp configured for assisting in the movement of the transfer sheet from the paper outlet of the printer to the heat transfer assembly.

8. The heat transfer roller apparatus of claim 1, wherein the carrier is further configured for selectively and automatically travelling between a paper outlet of the printer and the heat transfer assembly, such that the carrier is able to removably engage the leading edge of the transfer sheet upon the transfer sheet exiting the paper outlet of the printer, and subsequently transport the transfer sheet to the heat transfer assembly.

9. The heat transfer roller apparatus of claim 1, wherein the carrier is further configured for automatically positioning the transfer sheet in contact with the substrate in a desired location within the frame boundary.

10. The heat transfer roller apparatus of claim 1, wherein the support base and support frame are slidably or pivotally engaged with the heat transfer assembly, such that the support base and support frame are able to selectively slide or pivot a distance out and away from the heat transfer assembly for assisting in the manual placement of the substrate on the support base.

11. The heat transfer roller apparatus of claim 1, wherein the heat transfer assembly provides an at least one positioning indicator configured for assisting in the manual positioning of the substrate on the support base.

12. The heat transfer roller apparatus of claim 1, wherein the heat transfer assembly further provides an at least one sheet collection container positioned and configured for receiving the transfer sheet after the transfer sheet has been fully separated from the substrate by the carrier.

13. The heat transfer roller apparatus of claim 12, wherein the heat transfer assembly provides a discard ramp capable of extending between the carrier of the heat transfer assembly and the at least one sheet collection container, the discard ramp configured for assisting in the movement of the transfer sheet from the carrier to the at least one sheet collection container.

14. The heat transfer roller apparatus of claim 1, wherein the first and second ends of the support frame are configured for selectively rotating between one of a disengaged position—wherein each of the first and second ends is rotated away from the support base—and an engaged position—wherein each of the first and second ends is rotated into contact with the support base so as to sandwich the substrate substantially between the first and second ends of the support frame and the support base.

15. A heat transfer roller apparatus configured for transferring an at least one design onto a substrate, the apparatus comprising:

a heat transfer assembly positioned and configured for receiving a heat transfer compatible transfer sheet as it exits a printer, the printer configured for printing the at least one design onto the transfer sheet using a heat transfer compatible transfer ink, the heat transfer assembly comprising:

a support base positioned and configured for supporting the substrate thereon;

a support frame positioned and configured for selectively sandwiching the substrate substantially between the support frame and the support base, the support frame defining a frame boundary along at least a portion of a perimeter of the substrate such that a portion of the substrate positioned within the frame boundary and on which the at least one design is to be heat transferred is left substantially unobstructed by the support frame;

an articulating carrier providing:

an at least one clamp configured for removably engaging a leading edge of the transfer sheet, the at least one clamp further configured for selectively traveling between an upper end and an opposing lower end of the carrier for positioning the transfer sheet in contact with the substrate in a location within the frame boundary, preventing the transfer sheet from unintentionally moving out of position relative to the substrate as the design is transferred onto the substrate, and separating the transfer sheet from the substrate after the design has been transferred onto the substrate; and an at least one heat roller positioned proximal to the lower end of the carrier, in a position behind the at least one clamp, the at least one heat roller configured for being in selective rolling contact with the transfer sheet, within the frame boundary, when the transfer sheet is positioned on the substrate; and a controller configured for automatically controlling each of the carrier and at least one heat roller;

whereby, during use of the apparatus, with the substrate sandwiched between the support frame and the support base, and the at least one clamp engaged with the leading edge of the transfer sheet after the transfer sheet exits the printer, the at least one clamp moves toward the lower end of the carrier so as to position the transfer sheet on the substrate within the frame boundary, while the at least one heat roller simultaneously traverses across the transfer sheet—from a first end of the support frame to an opposing second end of the support frame—at a predetermined temperature, pressure and traversal time as set by the controller, so as to cause the at least one design on the transfer sheet to bond to the substrate, with the at least one clamp subsequently moving toward the upper end of the carrier so as to separate the transfer sheet from the substrate while the transfer sheet is still hot.

16. A method for transferring an at least one design from a heat transfer compatible transfer sheet onto a substrate using the heat transfer roller apparatus of claim 1, the method comprising the steps of:

positioning the substrate onto the support base;

moving the support frame into contact with the substrate, such that the substrate is sandwiched between the support frame and the support base while leaving substantially unobstructed a portion of the substrate on which the at least one design is to be heat transferred;

printing the at least one design onto the transfer sheet using the printer;

moving the transfer sheet from a paper outlet of the printer to the carrier of the heat transfer assembly;

positioning the transfer sheet, via the carrier, in contact with the substrate in a desired location within the frame boundary of the support frame; and upon the controller determining that the at least one heat roller has reached a desired temperature:

moving the at least one heat roller into rolling contact with the transfer sheet at a predetermined pressure;

rolling the at least one heat roller across the transfer sheet—from the first end of the support frame to the opposing second end of the support frame—at a predetermined traversal time, so as to cause the at least one design on the transfer sheet to bond to the substrate; and separating the transfer sheet, via the carrier, from the substrate while the transfer sheet is still hot.

17. The method of claim 16, further comprising the steps of:

moving the at least one heat roller into rolling contact with the substrate prior to the transfer sheet being positioned on the substrate; and rolling the at least one heat roller across the substrate—from the first end of the support frame to the opposing second end of the support frame—so as to dry and preheat the substrate prior to the transfer sheet being positioned on the substrate.

18. The method of claim 16, further comprising the step of rolling the at least one heat roller across the transfer sheet again—from the first end of the support frame to the opposing second end of the support frame—at a predetermined traversal time, so as to strengthen the bond between the at least one design and the substrate.

19. The method of claim 16, further comprising the steps of:

moving the at least one heat roller into rolling contact with the substrate after the at least one design has bonded to the substrate and the transfer sheet has been separated from the substrate; and rolling the at least one heat roller across the substrate—from the first end of the support frame to the opposing second end of the support frame—so as to increase the durability of the at least one design on the substrate.

* * * * *